US012093657B2

(12) United States Patent
Rosenthal et al.

(10) Patent No.: US 12,093,657 B2
(45) Date of Patent: Sep. 17, 2024

(54) COMPUTER ASSISTED ANSWERING BOOLEAN QUESTIONS WITH EVIDENCE

(71) Applicant: International Business Machines Corporation, Armonk, NY (US)

(72) Inventors: Sara Rosenthal, Spring Valley, NY (US); Jeffrey Scott McCarley, Bedford Hills, NY (US); Mihaela Ancuta Bornea, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/519,911

(22) Filed: Nov. 5, 2021

(65) Prior Publication Data

US 2023/0148228 A1    May 11, 2023

(51) Int. Cl.
*G06F 40/40* (2020.01)
*G06F 40/20* (2020.01)
*G06F 40/30* (2020.01)

(52) U.S. Cl.
CPC .............. *G06F 40/40* (2020.01); *G06F 40/20* (2020.01); *G06F 40/30* (2020.01)

(58) Field of Classification Search
CPC ........... G06F 40/30; G06F 40/20; G06F 40/40
See application file for complete search history.

(56) References Cited

U.S. PATENT DOCUMENTS

| 8,275,803 | B2 | 9/2012 | Brown et al. |
| 10,733,181 | B2 | 8/2020 | Boguraev et al. |
| 11,080,336 | B2 * | 8/2021 | Van Dusen ............ G06Q 10/10 |
| 11,790,182 | B2 * | 10/2023 | Tory ........................ G06F 40/35 |
| | | | 704/9 |
| 11,797,600 | B2 * | 10/2023 | Mazar .............. G06Q 10/06315 |
| 11,803,621 | B1 * | 10/2023 | Strong .................. G06F 16/903 |
| 11,818,174 | B1 * | 11/2023 | Strong .................... H04L 63/20 |

(Continued)

FOREIGN PATENT DOCUMENTS

| CN | 109325051 A | 2/2019 |
| CN | 112100345 A | 12/2020 |

(Continued)

OTHER PUBLICATIONS

"Patent Cooperation Treaty PCT Notification of Transmittal of the International Search Report and the Written Opinion of the International Searching Authority, or the Declaration", Applicant's file reference IEE220850PCT, International application No. PCT/CN2022/120697, International filing date Sep. 23, 2022, Date of mailing Dec. 15, 2022, 9 pages.

Clark, C. et al., "BoolQ: Exploring the Surprising Difficulty of Natural Yes/No. Questions", NAACL 2019, May 24, 2019, pp. 1-13, downloaded Nov. 5, 2021, https://arxiv.org/pdf/1905.10044.pdf, United States.

(Continued)

*Primary Examiner* — Eliyah S. Harper
(74) *Attorney, Agent, or Firm* — Stephen R. Yoder

(57) ABSTRACT

A method of using a computing device using natural language software to respond to a Boolean question is presented. The method includes receiving, by a computing device, a question and at least one passage. The computing device classifies the question as a Boolean type question. The computing device generates evidence from the at least one passage to the Boolean question. The computing device generates a response to the Boolean question using the generated evidence. The computing device provides the generated evidence that supports the response to the Boolean question.

11 Claims, 11 Drawing Sheets

(56) References Cited

U.S. PATENT DOCUMENTS

| | | | | |
|---|---|---|---|---|
| 11,824,866 B2* | 11/2023 | Szigeti | ................ | H04L 63/0861 |
| 11,868,718 B2* | 1/2024 | Moriya | ............... | G06F 16/3344 |
| 11,960,599 B2* | 4/2024 | Biller | .................. | G06F 11/3423 |
| 11,966,713 B1* | 4/2024 | Allocco | ................... | G06F 40/58 |
| 11,989,261 B2* | 5/2024 | Canim | ................... | G06F 16/248 |
| 11,989,597 B2* | 5/2024 | Walters | .................... | G06F 17/15 |
| 2012/0041950 A1 | 2/2012 | Koll | | |
| 2016/0162790 A1 | 6/2016 | Gordon | | |
| 2016/0267085 A1 | 9/2016 | Prager | | |
| 2016/0267392 A1 | 9/2016 | Prager | | |
| 2020/0285704 A1 | 9/2020 | Rajani | | |
| 2020/0372341 A1 | 11/2020 | Asai et al. | | |
| 2021/0192377 A1* | 6/2021 | Malon | .................... | G06N 5/045 |
| 2021/0216576 A1* | 7/2021 | Staub | ................. | G06Q 30/0282 |

FOREIGN PATENT DOCUMENTS

| | | |
|---|---|---|
| CN | 113519001 A | 10/2021 |
| JP | 2012088893 A | 5/2012 |
| KR | 10-17921871 A | 7/2017 |
| KR | 10-1984887 A | 11/2017 |
| KR | 20200024443 A | 3/2020 |

OTHER PUBLICATIONS

Geva, M., et al. "Did Aristotle Use a Laptop? A Question Answering Benchmark with Implicit Reasoning Strategies", TACL 2021, Transactions of the Association for Computational Linguistics, Apr. 2021, pp. 346-361, MIT Press Direct, vol. 9, United States.

De Young, J. et al., "Eraser: A Benchmark to Evaluate Rationalized NLP Models", ACL 2020, Nov. 8, 2019, pp. 1-16, downloaded Nov. 5, 2021, https://arxiv.org/pdf/1911.03429.pdf, United States.

Thorne, J. et al., "Evidence-based Verification for Real World Information Needs", Apr. 1, 2021, pp. 1-13, downloaded Nov. 5, 2021, https://arxiv.org/pdf/2104.00640.pdf, United States.

Jin, Q. et al,, "PubMedQA: A Dataset for Biomedical Research Question Answering", EMNLP 2019, Sep. 13, 2019, pp. 1-11, downloaded Nov. 5, 2021, https://arxiv.org/pdf/1909.06146.pdf, United States.

Clark, J. et al., "TyDi QA: A Benchmark for Information-Seeking Question Answering in Typologically Diverse Languages", TACL 2020, Jul. 1, 2020, pp. 454-470, vol. 8, MIT Press Direct, United States.

Mell et al., "The NIST Definition of Cloud Computing," National Institute of Standards and Technology Special Publication 800-145, Sep. 2011, 7 pages, United States.

* cited by examiner

Question: Are wolves good pets?   ANSWER: WEAK NO

<ins>Wolves as pets and working animals</ins>

Wolves are sometimes kept as exotic pets, and in some rarer occasions, as working animals. Although closely related to domesticated dogs, wolves do not show the same tractability as dogs in living alongside humans, and generally a greater amount of effort is required in order to obtain the same amount of reliability. Wolves also need much more space than dogs, about 25 to 40 square kilometres (10 to 15 sq mi) so they can exercise.

<ins>Rearing</ins>

Captive wolf puppies are usually taken from their mother at the age of 14 days, preferably no later than 21 days. Wolf pups require more socialisation than dog pups, and will typically stop responding to socialisation at the age of 19 days, as opposed to dogs which can still be socialised at the age of 16 weeks. For the first four months of their lives, wolf pups need to be kept isolated from adult canines, except for a few brief visits per week, in order for them to properly imprint on humans.

Did King Victor Emmanuel II have a wife? YES

Victor Emmanuel died in Rome in 1878, after meeting with Pope Pius IX's envoys, who had reversed the excommunication, and received last rites .

He was buried in the Pantheon .

His successor was his son Umberto I[3]

Family and children In 1842 he married his first cousin once removed Adelaide of Austria (1822-1855).

By her he had eight children:[4] Maria Clotilde (1843-1911), who married Napoléon Joseph (the Prince Napoléon) .

Their grandson Prince Louis Napoléon was the Bonapartist pretender to the French imperial throne .

```
┌─────────────────────────────────────┐
│ Receiving A Question and At Least One│
│              Passage                │
│                610                  │
└─────────────────────────────────────┘
                 ↓
┌─────────────────────────────────────┐
│ Classifying The Question As A Boolean│
│           Type Question             │
│                620                  │
└─────────────────────────────────────┘
                 ↓
┌─────────────────────────────────────┐
│ Generating Evidence From The At Least│
│     One Passage To The Boolean      │
│              Question               │
│                630                  │
└─────────────────────────────────────┘
                 ↓
┌─────────────────────────────────────┐
│ Generating A Response To The Boolean│
│ Question Using The Generated Evidence│
│                640                  │
└─────────────────────────────────────┘
                 ↓
┌─────────────────────────────────────┐
│ Providing the Generated Evidence That│
│  Supports The Response To The Boolean│
│              Question               │
│                650                  │
└─────────────────────────────────────┘
```

FIG. 6

COMPUTER ASSISTED ANSWERING BOOLEAN QUESTIONS WITH EVIDENCE

BACKGROUND

The field of embodiments of the present invention relates to use of a computing device using natural language software to respond to a Boolean question and automatically providing evidence and providing more fine-grained answers to Boolean questions in a question answering (QA) system.

QA systems are an important tool used by people seeking answers. In factoid question answering, there is a short answer to the question. In some cases, the answer is Boolean. Existing QA systems expect Boolean questions to be answered with Yes, No, or No Answer without providing justification. Further, a simple Yes/No is not always appropriate.

SUMMARY

Embodiments relate to use of a computing device using natural language software to respond to a Boolean question. One embodiment provides a method of using a computing device using natural language software to respond to a Boolean question is presented. The method includes receiving, by a computing device, a question and at least one passage. The computing device classifies the question as a Boolean type question. The computing device generates evidence from the at least one passage to the Boolean question. The computing device generates a response to the Boolean question from the generated evidence. The computing device provides the generated evidence that supports the response to the Boolean question. Some features contribute to the advantage of automatically providing evidence demarcation, and more fine-grained answers to Boolean questions in a QA system. This provides the user with a better understanding of the answer to the question. Other features provide that the Boolean questions and answers can be in one or more languages, and need not be the same language. Further features provide that multiple answers, even if conflicting, may be in one or more passages in a corpus.

One or more of the following features may be included. In some embodiments, the method may further include the feature that the classifying employs a question type classifier to determine the question type.

In some embodiments, the method may additionally include the feature that the response is a single Boolean type of answer. Another feature that may be included is that the response is more than one Boolean type of answer.

In one or more embodiments, the method may further include that the response is a fine-grained Boolean type of answer, and the fine-grained Boolean type of answer is labeled as a weak-No answer, a weak-Yes answer, both Yes and No answer or a scaled type of answer.

In some embodiments, the method may include that the generated evidence that supports the response is indicated by demarcating the generated evidence in the at least one passage.

In some embodiments, the method may include that the generated evidence comprises text-based evidence in one or more languages.

These and other features, aspects and advantages of the present embodiments will become understood with reference to the following description, appended claims and accompanying figures.

BRIEF DESCRIPTION OF THE DRAWINGS

FIG. 4 illustrates another example display of evidence in response to a proposed Boolean question, according to one embodiment;

FIG. 5 illustrates yet another example display of evidence in response to a proposed Boolean question, according to one embodiment;

FIG. 6 illustrates a process for using natural language software to respond to a Boolean question and automatically providing evidence and providing more fine-grained answers to Boolean questions, according to an embodiment;

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to use of a computing device using natural language software to respond to a Boolean question. One embodiment provides a method of using a computing device using natural language software to respond to a Boolean question is presented. The method includes receiving, by a computing device, a question and at least one passage. The computing device classifies the question as a Boolean type question. The computing device generates evidence from the at least one passage to the Boolean question. The computing device generates a response to the Boolean question using the generated evidence. The computing device provides the generated evidence that supports the response to the Boolean question. Some features contribute to the advantage of automatically providing evidence demarcation, and more fine-grained answers to Boolean questions in a QA system. This provides the user with a better understanding of the answer to the question. Other features provide that the Boolean questions and answers can be in one or more languages, and need not be the same language. Further features provide that multiple answers, even if conflicting, may be in one or more passages in a corpus.

In some embodiments, the method may further include the feature that the classifying employs a question type classifier to determine the question type.

In some embodiments, the method may additionally include the feature that the response is a single Boolean type of answer. Another feature that may be included is that the response is more than one Boolean type of answer.

In one or more embodiments, the method may further include that the response is a fine-grained Boolean type of answer, and the fine-grained Boolean type of answer is labeled as a weak-No answer, a weak-Yes answer, both Yes and No answer or a scaled type of answer.

In some embodiments, the method may include that the generated evidence that supports the response is indicated by demarcating the generated evidence in the at least one passage.

In some embodiments, the method may include that the generated evidence comprises text-based evidence in one or more languages.

Figure 1:
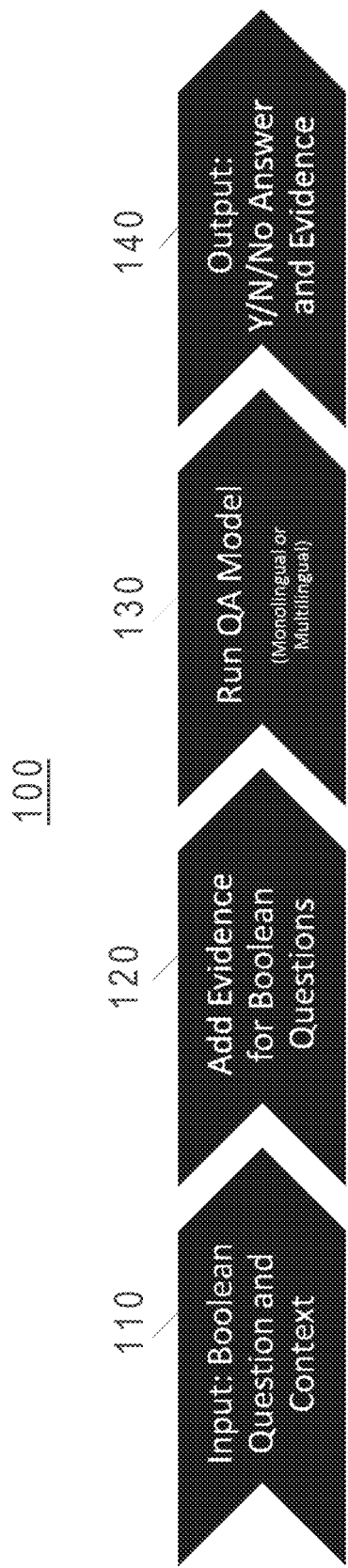
FIG. 1 illustrates a Boolean question answering (QA) pipeline, according to one embodiment.

FIG. 1 illustrates a Boolean question answering (QA) pipeline 100, according to one embodiment. In some embodiments, the pipeline 100 is an MRC pipeline. In one embodiment, in block 110, a Boolean question and context are received by a computing device using natural language software (e.g., conventional natural language understanding software, etc.) of a QA system. In block 120, evidence is added for Boolean questions, such as information from a corpus or collection of documents, publications, internal documents, etc., with text that relates to the Boolean question (e.g., found through a conventional natural language search application, etc.). In block 130, a QA model (e.g., monolingual or multilingual) is executed. In block 140, the output is generated from the QA model with a Y(es), N(o), No answer, Yes and No, weak-No, weak-Yes, scaled, etc. along with evidence (e.g., textual information) supporting the output. In one or more embodiments, the QA model has the ability for conflicting answers in a single passage to be highlighted for the user. The use of evidence for Boolean questions improves the QA system as the user has the text automatically displayed and highlighted to provide more support for the Boolean of fine-grained answers. This also provides the user with a better understanding of the answer to the question.

Figure 2:
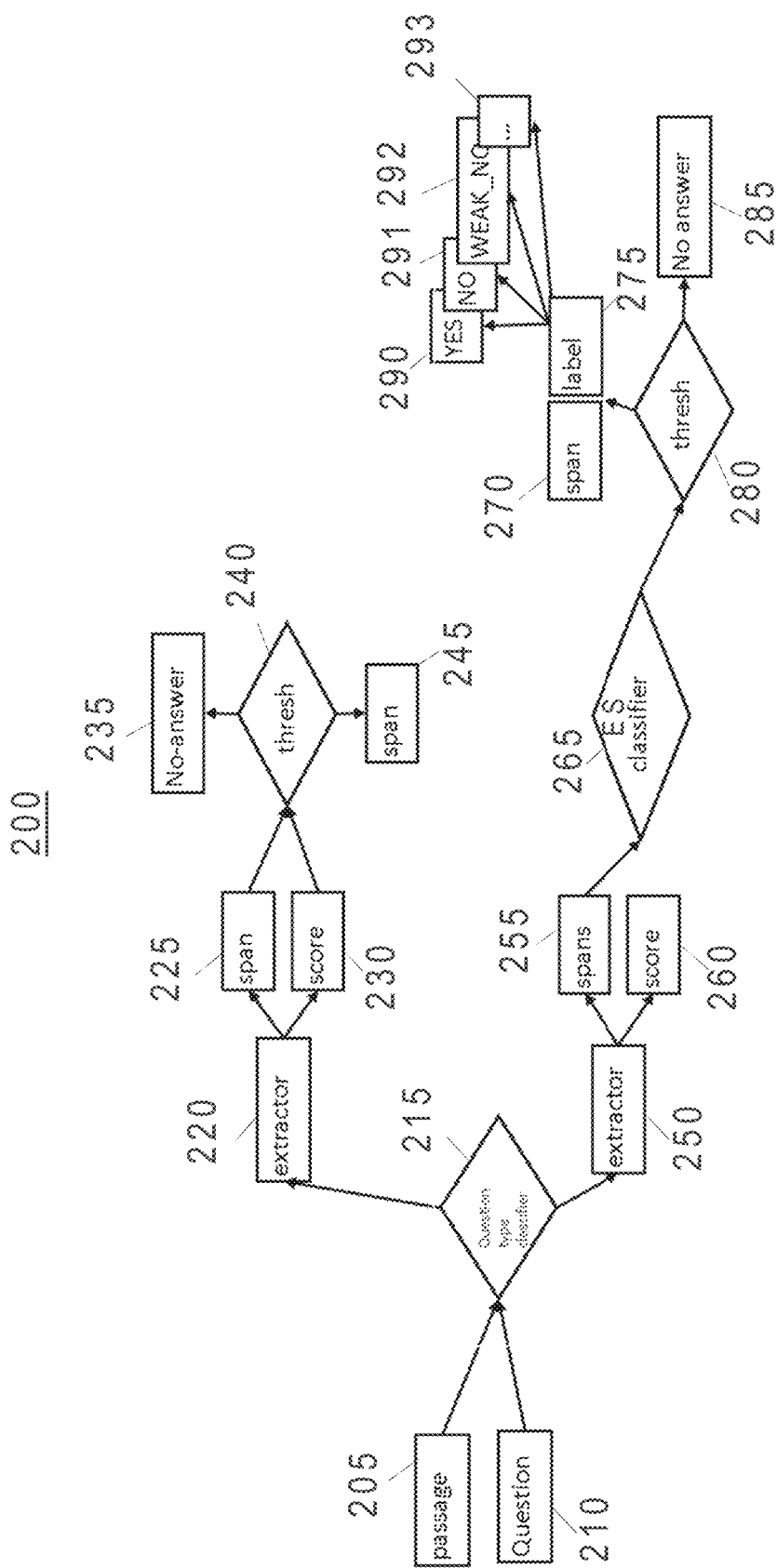
FIG. 2 illustrates a machine reading comprehension (MRC) pipeline with Boolean questions, according to one embodiment.

FIG. 2 illustrates a machine reading comprehension (MRC) pipeline 200 with Boolean questions, according to one embodiment. In block 210 a textual (which may be in natural language or converted from voice to natural language using a conventional application, etc.) question is provided, such as by obtaining from another passage, obtained from a computing device or memory from an initiating user, resulted from a search query, etc. In block 205, one or more supporting passages are provided based on one or more topics or words obtained from the question 210, a search query (e.g., using a search engine), etc. The one or more passages may be obtained from one or more documents, other natural language sources, such as emails, articles, etc.) based on elements in the question. In block 215, a question type classifier uses natural language understanding (NLU) that classifies a type of question to provide information addressing whether the question is of a Boolean type or not. If the question type classifier determines the question has a traditional answer (e.g., Who is the president of the United States?) or is selected to have such an answer, the pipeline 200 proceeds to block 220 where an extractor (e.g., a conventional text-based extractor, etc.) is employed to extract portions from the supporting passage(s) 205 based on the type of question. In block 225, pipeline 200 sets the answer span over the passage for the question text (if appropriate), and sets any other features in the extracted text. Note that there may be multiple instances of these. In block 230, a score that was determined by the extractor in block 220 for the span of the supporting passage(s) is stored in a memory device. The extractor in block 220 may implement scoring via a simple term match score implementing executable instructions for counting the number of terms that match; textual alignment implementing executable instructions for determining if words appear in the same or similar order with a similar distance between them so they are not separated much (aligned) that is advantageous to find a quotation to find quotes, for example, an alignment may be performed to obtain the best result; and, a deeper analysis implementing executable instructions for determining the meaning of the passages/question (i.e., lexical and/or semantic relations). Each of these analyses produces a score. In one or more embodiments, the span from block 225 and the score from block 230 are used in block 240 to determine whether a threshold is exceeded or not. If the threshold is not met, the result in block 235 is No-answer. If the threshold is met or exceeded, in block 245 a span from the passage supporting the non-boolean answer is output.

If the question type classifier in block 215 determines the question is Boolean (such as "Is Joe Biden the president of the United States?), or is selected to be a Boolean type question, the pipeline 200 proceeds to block 250 where an extractor (e.g., a conventional text-based extractor, etc.) is employed to extract portions from the supporting passage(s) 205 based on the type of question. In block 255, pipeline 200 sets the span over the question text (if appropriate), and sets any other features in the extracted text. Note that there may be multiple instances of these. In block 260, a score is determined for the span of the supporting passage(s) using a conventional scoring application or algorithm. In block 265, the evidence span classifier determines the answer (e.g., weak No, weak Yes, No, Yes, Yes and No, etc.) to a Boolean type question. In block 280, it is determined whether the answer has a value that meets (e.g., equal to or greater) a threshold or not (e.g., less than the threshold) for having an answer (i.e., Yes and No, weak-No, weak-Yes, scaled, etc.). If it is determined there is no answer, the pipeline 200 proceeds to block 285 where the output is no answer. Otherwise, the pipeline 200 proceeds to block 270 where the span of the passages for the answer is set. In some embodiments, the pipeline 200 provides a label 275 for fine-grained short answer(s) besides Yes 290 and No 291 are provided as output, which may include weak-No 292, or others 293, such as weak-Yes. Alternatively, a scale of 1-n can be used instead of short answers, where 1 may indicate a strong No and n would indicate a strong Yes. For each short answer, the pipeline 200 demarcates or highlights the evidence span 270 in the passage that explains the reasoning for the label generated in block 275 for that short answer, and each short answer's evidence span may have a different label. In addition to highlighting the evidence span in block 270 co-reference resolution may be applied to highlight the appropriate entity. The output evidence span from block 270 is highlighted as justification for the output short answer(s). In some embodiments, the highlighting may include colors (e.g., fixed, or selectable), underlining, other markings (e.g., blurring portions of text while making evidence readable, larger font, bring to front, place behind, etc.). The Boolean questions and answers may be in one or more languages, and they need not be the same language. Multiple answers may be in one or more passages in a corpus, depository, etc.

Unlike conventional systems that may have the ability to only output some evidence for Boolean type questions without labeling an answer, those systems do not automatically highlight supporting passages of the evidence for multiple answers (e.g., Yes and No), they do not provide an answer with polarity that is fine-grained, and they do not even handle cases where there can be both Yes and No answers in a single passage or multiple passages. Further distinguishable from conventional systems, one or more embodiments classify questions as Boolean and non-Boolean, and display highlighted supporting evidence of for Boolean questions. Some embodiments capture use cases where Boolean questions may not have a straight-forward Yes or No answer; and these embodiments also work with one or more different languages. Using a question type classifier 215 to identify which questions are Boolean is more reliable than conventional systems and also avoids giving a YES/NO answer when the question is not Boolean.

Figure 3:
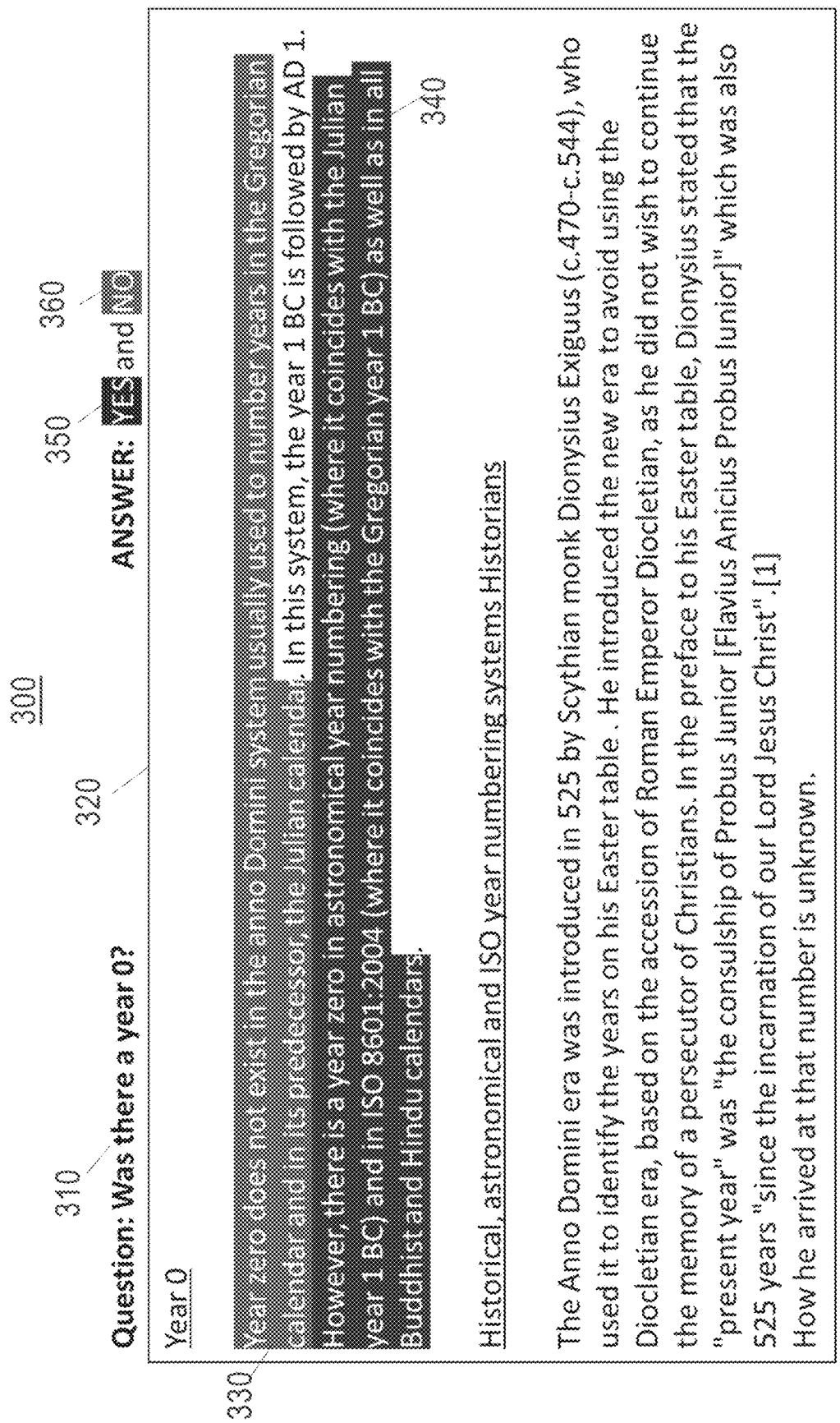
FIG. 3 illustrates an example display of evidence in response to a proposed Boolean question, according to one embodiment.

FIG. 3 illustrates an example display 300 of evidence 320 in response to a proposed Boolean question 310, according to one embodiment. As shown, the support evidence 330 and 340 in the contextual surrounding passages 320 are indicated in this example as highlighting, and have different highlighting from one another. Support evidence 330 is associated with the output answer No 360, and support evidence 340 is associated with output answer Yes 350. The contextual surrounding passage 320 is also displayed for context. The output answers Yes 350 and No 360 alerts the viewer that there are multiple answers to the Boolean question 310 labeled by block 275 (FIG. 2) as Yes and No, there is supporting evidence 330 and 340 for answers Yes 350 and No 360, which are each highlighted in the example display 300 the same as the respective supporting evidences 330 and 340.

FIG. 4 illustrates another example display 400 of evidence 420 in response to a proposed Boolean question 410, according to one embodiment. In this example display 400, the supporting evidence 430 is highlighted and associated with the answer Weak-No 440. The answer Weak-No 440 alerts the viewer that the answer to the Boolean question 410 is likely No, but that answer does not have enough weight over the threshold 280 (FIG. 2) to be labeled in block 275 (FIG. 2) as a No, so block 275 labeled the output as Weak-No 292 for the result output answer Weak-No 440, which is highlighted the same in the example display 400 as the support evidence 430.

FIG. 5 illustrates yet another example display 500 of evidence 520 in response to a proposed Boolean question 510, according to one embodiment. In this example display 500, the supporting evidence 530 is highlighted and associated with the answer Yes 540. The answer Yes 540 alerts the viewer that the answer to the Boolean question had enough weight over the threshold 280 (FIG. 2) to be labeled in block 275 (FIG. 2) as a Yes 290, so block 275 labeled the output as Yes 540 for the result output answer, which is highlighted the same in the example display 500 as the supporting evidence 530.

FIG. 6 illustrates a process 600 for using natural language software to respond to a Boolean question and automatically providing evidence and providing more fine-grained answers to Boolean questions, according to an embodiment. In block 610, process 600 provides receiving, by a computing device (e.g., from computing node 10, FIG. 7, hardware and software layer 60, FIG. 8, processing system 900, FIG. 9, system 1000, FIG. 10, system 1100, FIG. 11, etc.), a question (e.g., a simple question, a Boolean question, etc.) and at least one passage. In block 620, process 600 provides classifying, by the computing device, the question as a Boolean type question. In block 630, process 600 provides generating, by the computing device, evidence from the at least one passage. In block 640, process 600 provides generating, by the computing device, a response (e.g., Yes, No, Yes and No, weak-Yes, weak-No, 1-n (n is an integer where the higher the n, the stronger the answer as Yes or No, depending on implementation) to the Boolean question using the generated evidence. In block 650, process 600 includes providing, by the computing device, the generated evidence (e.g., textual passage(s)) and response that supports the response to the Boolean question.

In some embodiments, process 600 provides the feature that the classifying employs a question type classifier to determine the question type (e.g., Boolean, non-Boolean, etc.). In one or more embodiments, process 600 may include that the response is a single Boolean type of answer (e.g., Yes, No).

In some embodiments, process 600 provides the feature that the response is more than one Boolean type of answer (e.g., Yes and No). In one or more embodiments, process 600 may include that the response is a fine-grained Boolean type of answer, and the fine-grained Boolean type of answer is labeled as a weak-No answer, a weak-Yes answer, both Yes and No answer or a scaled type (e.g., 1-n) of answer.

In one or more embodiments, process 600 provides that the generated evidence that supports the response is indicated by demarcating (e.g., include colors (e.g., fixed, or selectable), underlining, other markings (e.g., blurring portions of text while making evidence readable, larger font, bring to front, place behind, etc.)), the generated evidence in the at least one passage.

In some embodiments, process 600 provides that the generated evidence comprises text-based evidence in one or more languages.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 7:
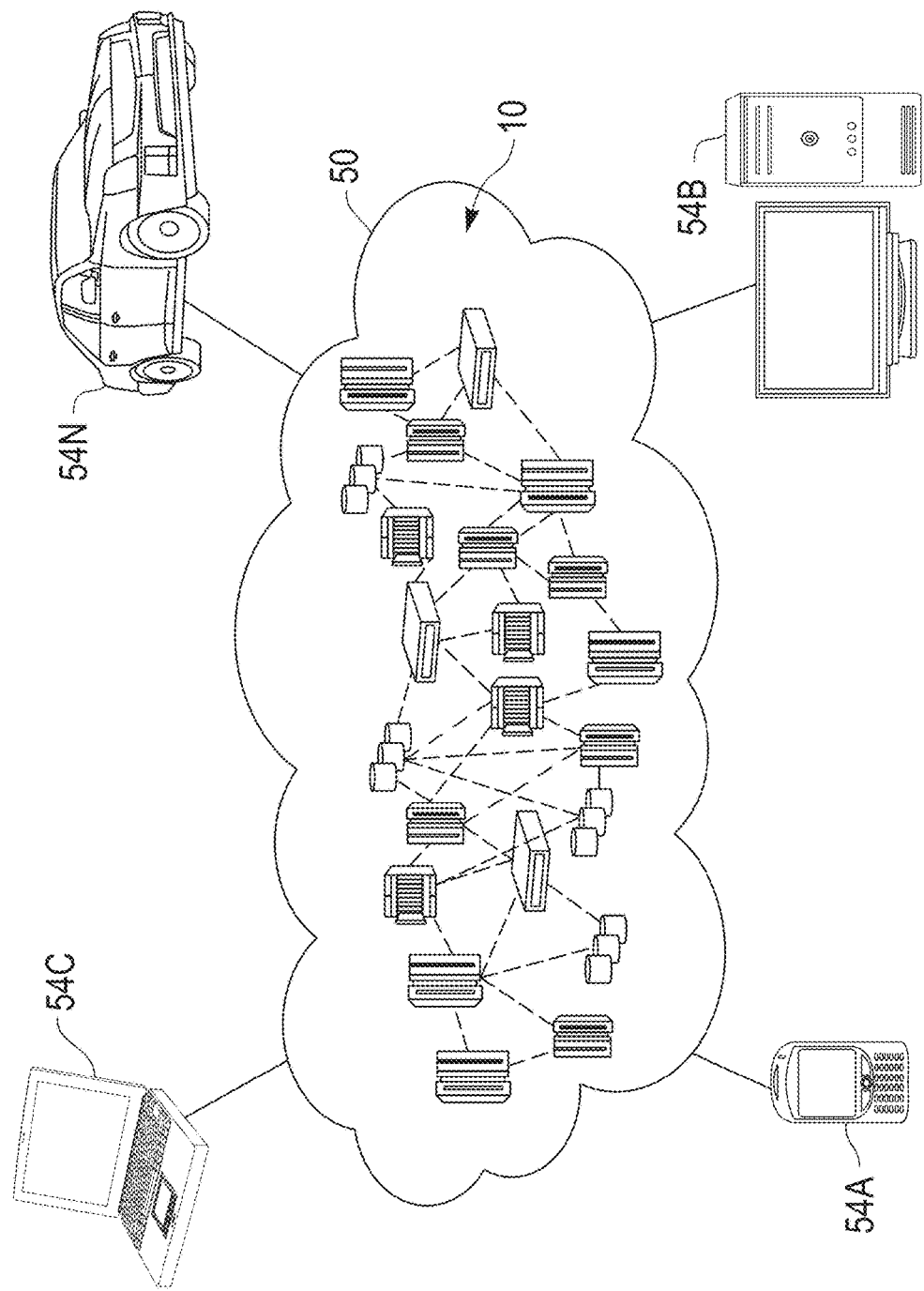
FIG. 7 depicts a cloud computing environment, according to an embodiment.

Referring now to FIG. 7 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
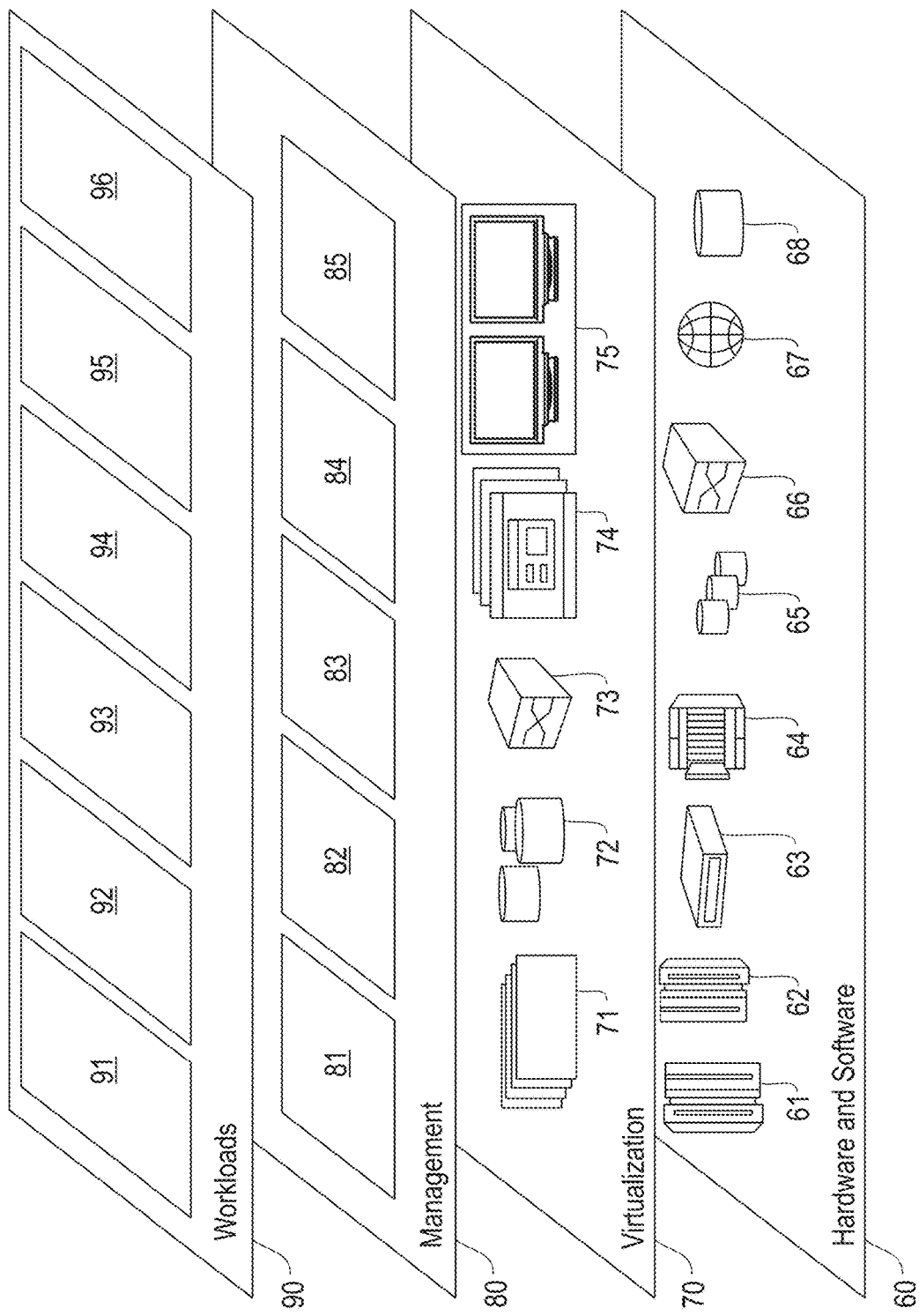
FIG. 8 depicts a set of abstraction model layers, according to an embodiment.

Referring now to FIG. 8, a set of functional abstraction layers provided by the cloud computing environment 50 (FIG. 7) is shown. It should be understood in advance that the components, layers, and functions shown in FIG. 8 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for using natural language software to respond to a Boolean question and automatically providing evidence and providing more fine-grained answers to Boolean questions processing 96 (see, e.g., pipeline 200, FIG. 2, process 600, FIG. 6, system 900, FIG. 9, system 1000, FIG. 10, system 1100, FIG. 11, etc.). As mentioned above, all of the foregoing examples described with respect to FIG. 8 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 9:
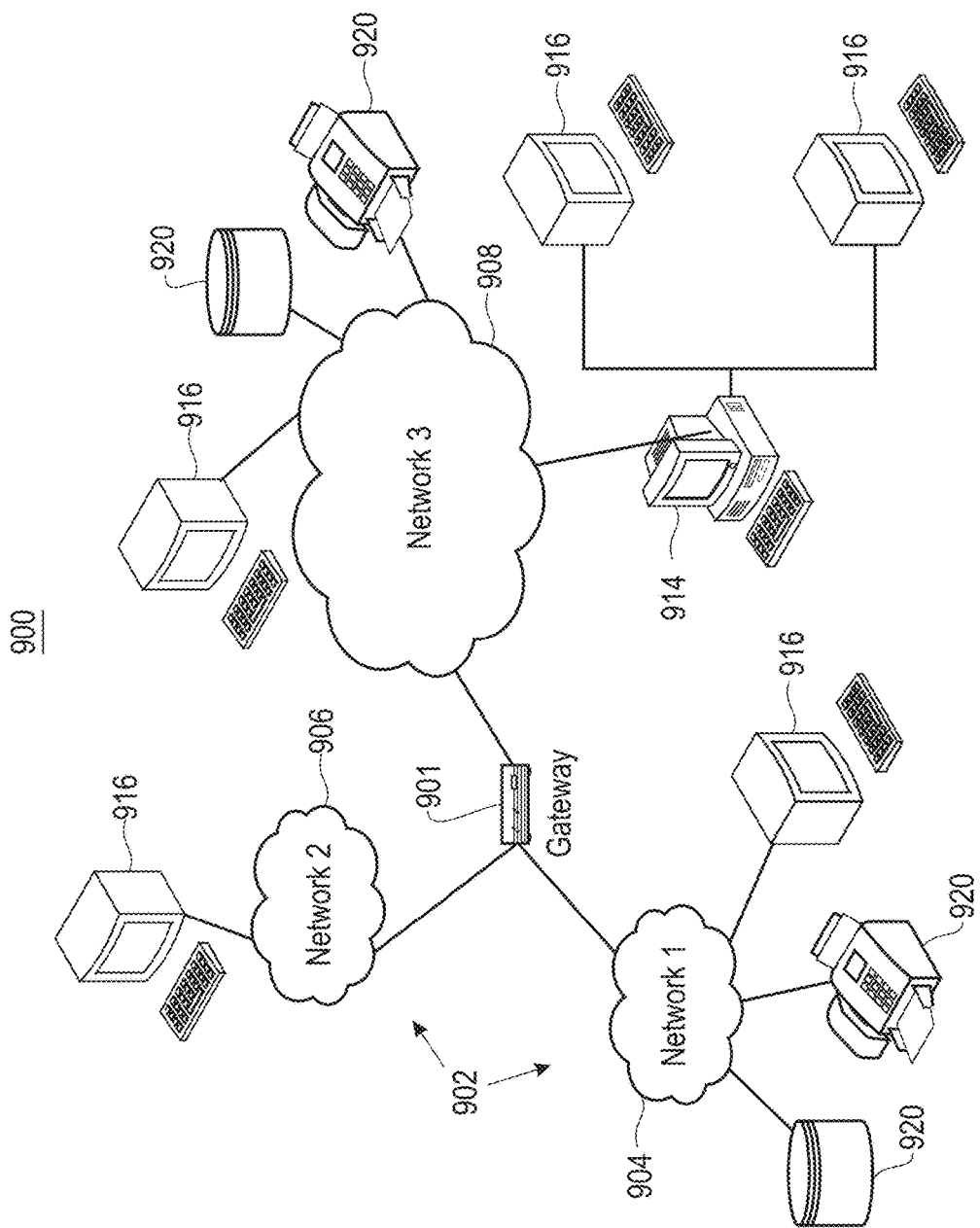
FIG. 9 is a network architecture of a system for using natural language software to respond to a Boolean question and automatically providing evidence and providing more fine-grained answers to Boolean questions, according to an embodiment.

FIG. 9 is a network architecture of a system 900 for using natural language software to respond to a Boolean question and automatically providing evidence and providing more fine-grained answers to Boolean questions, according to an embodiment. As shown in FIG. 9, a plurality of remote networks 902 are provided, including a first remote network 904 and a second remote network 906. A gateway 901 may be coupled between the remote networks 902 and a proximate network 908. In the context of the present network architecture 900, the networks 904, 906 may each take any form including, but not limited to, a LAN, a WAN, such as the Internet, public switched telephone network (PSTN), internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet.

Further included is at least one data server 914 coupled to the proximate network 908, which is accessible from the remote networks 902 via the gateway 901. It should be noted that the data server(s) 914 may include any type of computing device/groupware. Coupled to each data server 914 is a plurality of user devices 916. Such user devices 916 may include a desktop computer, laptop computer, handheld computer, printer, and/or any other type of logic-containing device. It should be noted that a user device 916 may also be directly coupled to any of the networks in some embodiments.

A peripheral 920 or series of peripherals 920, e.g., facsimile machines, printers, scanners, hard disk drives, networked and/or local storage units or systems, etc., may be coupled to one or more of the networks 904, 906, 908. It should be noted that databases and/or additional components may be utilized with, or integrated into, any type of network element coupled to the networks 904, 906, 908. In the context of the present description, a network element may refer to any component of a network.

According to some approaches, methods and systems described herein may be implemented with and/or on virtual systems and/or systems, which emulate one or more other systems, such as a UNIX® system that emulates an IBMR z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 10:
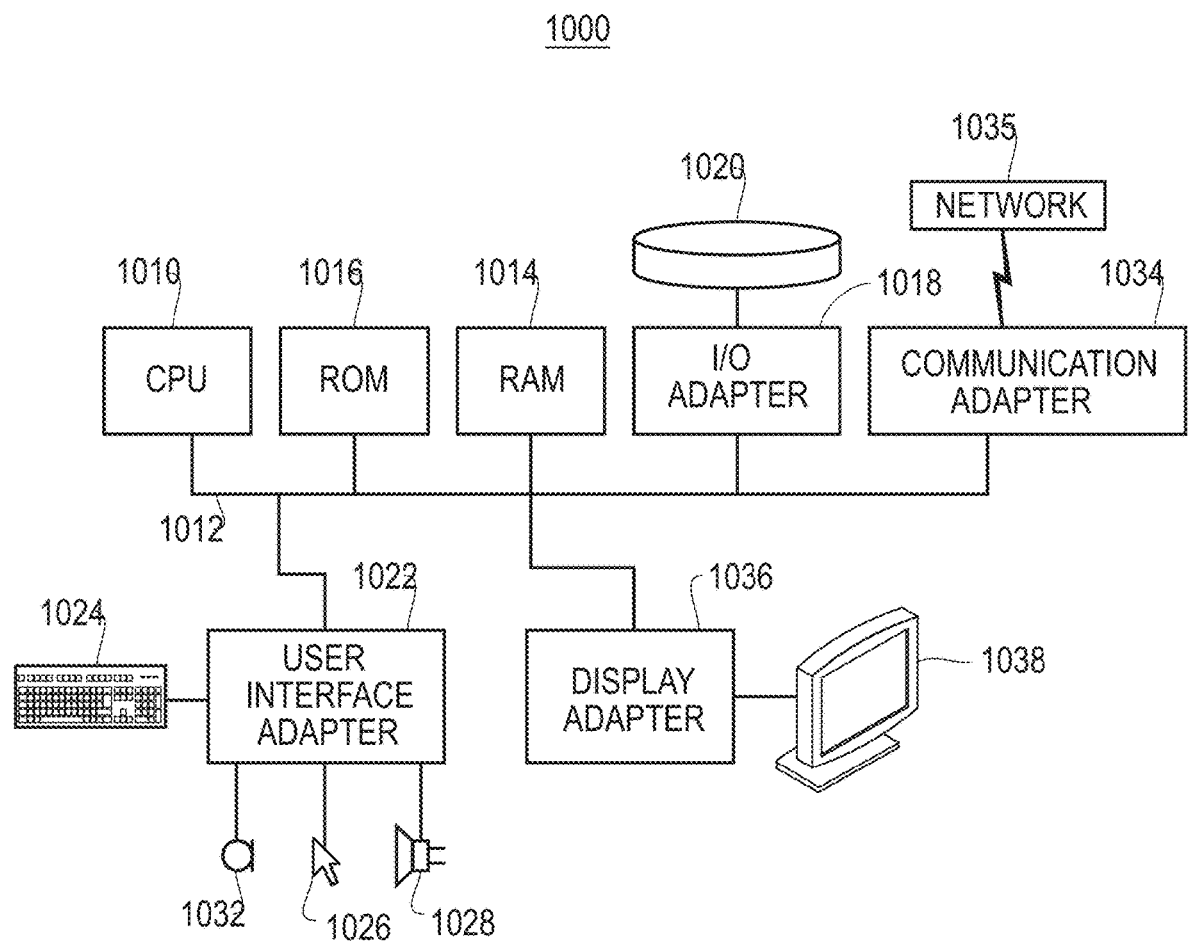
FIG. 10 shows a representative hardware environment that may be associated with the servers and/or clients of FIG. 7, according to an embodiment.

FIG. 10 shows a representative hardware system 1000 environment associated with a user device 916 and/or server 914 of FIG. 9, in accordance with one embodiment. In one example, a hardware configuration includes a workstation having a central processing unit 1010, such as a microprocessor, and a number of other units interconnected via a system bus 1012. The workstation shown in FIG. 10 may include a Random Access Memory (RAM) 1014, Read Only Memory (ROM) 1016, an I/O adapter 1018 for connecting peripheral devices, such as disk storage units 1020 to the bus 1012, a user interface adapter 1022 for connecting a keyboard 1024, a mouse 1026, a speaker 1028, a microphone 1032, and/or other user interface devices, such as a touch screen, a digital camera (not shown), etc., to the bus 1012, communication adapter 1034 for connecting the workstation to a communication network 1035 (e.g., a data processing network) and a display adapter 1036 for connecting the bus 1012 to a display device 1038.

In one example, the workstation may have resident thereon an operating system, such as the MICROSOFT® WINDOWS® Operating System (OS), a MAC OSR, a UNIXR OS, etc. In one embodiment, the system 1000 employs a POSIXR based file system. It will be appreciated that other examples may also be implemented on platforms and operating systems other than those mentioned. Such other examples may include operating systems written using JAVAR, XML, C, and/or C++ language, or other programming languages, along with an object oriented programming methodology. Object oriented programming (OOP), which has become increasingly used to develop complex applications, may also be used.

Figure 11:
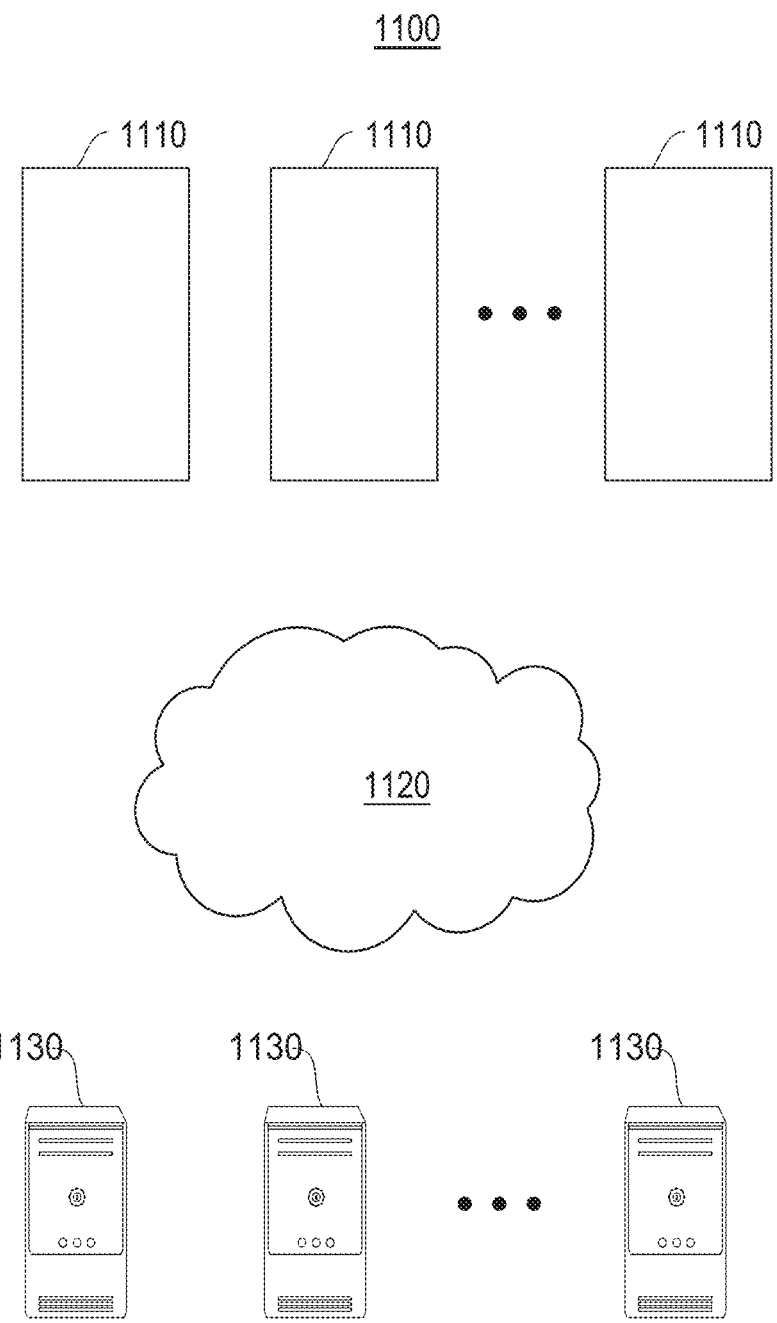
FIG. 11 is a block diagram illustrating a distributed system for using natural language software to respond to a Boolean question and automatically providing evidence and providing more fine-grained answers to Boolean questions, according to one embodiment.

FIG. 11 is a block diagram illustrating a distributed system 1100 for using natural language software to respond to a Boolean question and automatically providing evidence and providing more fine-grained answers to Boolean questions, according to one embodiment. In one embodiment, the system 1100 includes client devices 1110 (e.g., mobile devices, smart devices, computing systems, etc.), a cloud or resource sharing environment 1120 (e.g., a public cloud computing environment, a private cloud computing environment, a data center, etc.), and servers 1130. In one embodiment, the client devices 1110 are provided with cloud services from the servers 1130 through the cloud or resource sharing environment 1120.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A computer-implemented method of using natural language software to respond to a Boolean question, the method comprising:
   receiving a question and at least one passage;
   classifying the question as a Boolean type of question;
   generating evidence from the at least one passage to answer the Boolean type of question;
   generating a response to the Boolean type of question using the generated evidence, wherein the response is a fine-grained Boolean type of answer labeled as a weak-No answer, a weak-Yes answer, both Yes and No answer, or a scaled type of answer; and
   providing the generated evidence that supports the response to the Boolean type of question.

2. The method of claim 1, wherein the classifying employs a question type classifier to determine the question type.

3. The method of claim 1, wherein the generated evidence that supports the response is indicated by demarcating the generated evidence in the at least one passage.

4. The method of claim 1, wherein the generated evidence comprises text-based evidence in one or more languages.

5. A computer program product for using natural language software to respond to a Boolean question, the computer program product comprising a computer readable storage medium having program instructions embodied therewith, the program instructions executable by a processor to cause the processor to:
   receive a question and at least one passage;
   classify the question as a Boolean type of question;
   generate evidence from the at least one passage to answer the Boolean type of question;
   generate a response to the Boolean type of question using the generated evidence, wherein the response is a fine-grained Boolean type of answer labeled as a weak-No answer, a weak-Yes answer, both Yes and No answer, or a scaled type of answer; and
   provide the generated evidence that supports the response to the Boolean type of question.

6. The computer program product of claim 5, wherein the classifying employs a question type classifier to determine the question type.

7. The computer program product of claim 5, wherein the generated evidence that supports the response is indicated by demarcating the generated evidence in the at least one passage.

8. The computer program product of claim 5, wherein the generated evidence comprises text-based evidence in one or more languages.

9. An apparatus comprising:
   a memory configured to store instructions; and
   a processor configured to execute the instructions to:
   receive a question and at least one passage;
   classify the question as a Boolean type of question;
   generate evidence from the at least one passage to the Boolean type of question;
   generate a response to the Boolean type of question using the generated evidence, wherein the response is a fine-grained Boolean type of answer labeled as a weak-No answer, a weak-Yes answer, both Yes and No answer, or a scaled type of answer; and
   provide the generated evidence that supports the response to the Boolean type of question.

10. The apparatus of claim 9, wherein the classifying employs a question type classifier to determine the question type.

11. The apparatus of claim 9, wherein the generated evidence that supports the response is indicated by demarcating the generated evidence in the at least one passage, and the generated evidence comprises text-based evidence in one or more languages.

* * * * *